United States Patent
Raizen

(10) Patent No.: US 9,400,611 B1
(45) Date of Patent: Jul. 26, 2016

(54) DATA MIGRATION IN CLUSTER ENVIRONMENT USING HOST COPY AND CHANGED BLOCK TRACKING

(71) Applicant: EMC Corporation, Hopkinton, MA (US)

(72) Inventor: Helen S. Raizen, Jamaica Plain, MA (US)

(73) Assignee: EMC Corporation, Hopkinton, MA (US)

( * ) Notice: Subject to any disclaimer, the term of this patent is extended or adjusted under 35 U.S.C. 154(b) by 732 days.

(21) Appl. No.: 13/798,504

(22) Filed: Mar. 13, 2013

(51) Int. Cl.
 *G06F 17/30* (2006.01)
 *G06F 3/06* (2006.01)

(52) U.S. Cl.
 CPC ........ *G06F 3/0647* (2013.01); *G06F 17/30581* (2013.01)

(58) Field of Classification Search
 CPC ................ G06F 17/30194; G06F 17/30233; G06F 17/30174; G06F 17/30371; G06F 3/0619; G06F 3/0647; G06F 3/0689; G06F 3/0617; G06F 3/065; G06F 3/067; G06F 11/1662; G06F 11/0793; G06F 11/1469; G06F 11/2082; G06F 11/2069; G06F 3/0698; G11B 20/10; G11B 20/1217; G11B 20/1258; G11B 5/02
 See application file for complete search history.

(56) References Cited

U.S. PATENT DOCUMENTS

| | | | |
|---|---|---|---|
| 4,989,134 A * | 1/1991 | Shaw | G06F 12/0269 711/E12.011 |
| 6,108,748 A | 8/2000 | Ofek et al. | |
| 7,039,661 B1 * | 5/2006 | Ranade | G06F 17/30575 707/610 |
| 7,076,690 B1 | 7/2006 | Todd et al. | |
| 7,080,221 B1 * | 7/2006 | Todd | G06F 3/0605 711/161 |
| 7,080,225 B1 | 7/2006 | Todd | |
| 7,093,088 B1 | 8/2006 | Todd et al. | |
| 7,263,590 B1 * | 8/2007 | Todd | G06F 12/02 707/999.202 |

(Continued)

OTHER PUBLICATIONS

An-I Andy Wang, Geoff Kuenning, Peter Reiher and Gerald Popek—"The Conquest File System: Better Performance Through a Disk/Persistent-RAM Hybrid Design"—Published in: Journal ACM Transactions on Storage (TOS) TOS Homepage archive—vol. 2 Issue 3, Aug. 2006—pp. 309-348.*

(Continued)

*Primary Examiner* — Anh Ly
(74) *Attorney, Agent, or Firm* — BainwoodHuang

(57) ABSTRACT

Data is non-disruptively migrated from a source LUN to a target LUN in an active-active cluster with coordination of a host-based copy sweep with duplicating of ongoing writes of all hosts, using iteration and changed block tracking (CBT). During a first iteration, one host performs the copy sweep, and the locations of new application writes at other hosts are recorded in respective CBT records. In each subsequent iteration, the data blocks of the CBT-recorded writes are copied to the target LUN while the locations of new writes are recorded in new CBT records. A final iteration is done with I/O suspended to completely synchronize the target LUN with the source LUN, and the migration then proceeds to a committed state in which the target LUN is used in place of the source LUN. The one host may use write cloning or CBT recording like the other hosts.

25 Claims, 7 Drawing Sheets

(56) References Cited

U.S. PATENT DOCUMENTS

| | | | |
|---|---|---|---|
| 7,415,591 B1* | 8/2008 | Todd | G06F 3/0614 711/165 |
| 7,684,563 B1* | 3/2010 | Olson | H04L 9/0643 380/28 |
| 7,770,053 B1* | 8/2010 | Bappe | G06F 11/0793 714/3 |
| 7,770,056 B2* | 8/2010 | Malaviya | G06F 11/0778 714/15 |
| 7,805,583 B1 | 9/2010 | Todd et al. | |
| 7,809,912 B1 | 10/2010 | Raizen et al. | |
| 7,890,664 B1 | 2/2011 | Tao et al. | |
| 7,904,681 B1 | 3/2011 | Bappe et al. | |
| 7,945,669 B2 | 5/2011 | Bober et al. | |
| 8,775,861 B1 | 7/2014 | Raizen et al. | |
| 2003/0188233 A1* | 10/2003 | Lubbers | G06F 11/2069 714/100 |
| 2004/0080558 A1 | 4/2004 | Blumenau et al. | |
| 2005/0081006 A1* | 4/2005 | Shackelford | G06F 11/2069 711/162 |
| 2006/0047903 A1* | 3/2006 | Passerini | G06F 3/0622 711/114 |
| 2007/0263637 A1* | 11/2007 | Madnani | G06F 3/0605 370/396 |
| 2007/0271434 A1* | 11/2007 | Kawamura | G06F 3/0608 711/165 |
| 2008/0005507 A1* | 1/2008 | Madnani | G06F 3/0607 711/161 |
| 2010/0186014 A1* | 7/2010 | Vaghani | G06F 3/06 711/E12.002 |
| 2011/0082988 A1* | 4/2011 | Kono | G06F 3/0605 711/161 |
| 2011/0153917 A1* | 6/2011 | Maita | G06F 1/3225 711/103 |
| 2012/0131309 A1* | 5/2012 | Johnson | G06F 9/30 712/41 |
| 2013/0024639 A1* | 1/2013 | Yamamoto | G06F 3/0617 711/165 |

OTHER PUBLICATIONS

Koji Hasebe et al.—"Power-Saving in Large-Scale Storage Systems with Data Migration"—Published in: Cloud Computing Technology and Science (CloudCom), 2010 IEEE Second International Conference on—Date of Conference: Nov. 30, 2010-Dec. 3, 2010—pp. 266-273.*

"EMC RecoverPoint/SE for the CLARiiON CX4. White Paper.", Published by EMC Corporation in Feb. 2010. https://www.emc.com/collateral/software/white-papers/h5703-recoverpoint-with-clariion-cx4-wp.pdf.

"ESXi Configuration Guide.", Published by VMware on Jul. 13, 2010. https://www.vmware.com/support/pubs/vs_pubs_esxi41_i_vc41.html.

"Non-Disruptive and Minimally Disruptive Data Migration in Active-Active Clusters", Pending U.S. Appl. No. 13/727,884, filed Dec. 27, 2012.

* cited by examiner

DATA MIGRATION IN CLUSTER ENVIRONMENT USING HOST COPY AND CHANGED BLOCK TRACKING

BACKGROUND

The present invention relates to migration of data from a source data storage device to a target data storage device in a data processing system.

Data migration techniques are used to move or "migrate" data from one storage device (or logical unit) to another for any of a variety of purposes, such as upgrading storage hardware or information lifecycle management. Generally, migration involves synchronizing the target device to the source device, i.e., achieving an operating state in which the target device stores the same data as the source device, and then switching operation so that subsequent accesses of the data are directed to the target device instead of the source device. Once the switching is successfully accomplished, the source device can be taken out of service or put to some other use.

Non-disruptive migration is performed while there is ongoing application-level access to the data stored on the source storage device. In non-disruptive migration, there are two parts to achieving synchronization—a "copy sweep" by which all existing data on the source device is copied to the target device, and "cloning" (duplicating) of ongoing application writes for the source device to the target device. Non-disruptive migration also requires a non-disruptive mechanism for switching operation to the target device. Example descriptions of non-disruptive migration can be found in the following US patents, whose entire contents are incorporated by reference herein:
1. U.S. Pat. No. 7,904,681 Methods and systems for migrating data with minimal disruption
2. U.S. Pat. No. 7,809,912 Methods and systems for managing I/O requests to minimize disruption required for data migration
3. U.S. Pat. No. 7,770,053 Systems and methods for maintaining data integrity during a migration Clustering is a technique used in computer systems to provide certain desirable functionality and characteristics from the perspective of external users. Advantages include increased performance and availability over non-clustered systems. Two general types of clusters are "failover" and "active-active" (or "parallel") clusters. In a failover cluster, all cluster nodes may be aware of a given storage device accessible in the cluster, but in general a given storage device is accessed by only one node during operation. In the event of node failure, a failover mechanism causes ownership of the storage device to be transferred to a new node that has assumed responsibility for the workload of the failed node. Due to the single-node access, there is no need for synchronizing accesses among the hosts. In active-active clusters, storage devices may be actively accessed from all nodes in the cluster, and the operating software (e.g., application software) of the nodes is responsible for synchronizing access to shared storage resources.

SUMMARY

It is desirable to support non-disruptive data migration in clustered computer systems, including active-active clusters, but such systems present certain challenges that must be addressed. In general all hosts of an active-active cluster may be accessing a source device or LUN (logical unit of storage) during a migration, and writes from the hosts to the source LUN must be duplicated to the target LUN. This activity must somehow be coordinated with the copying operation used in migration in order to maintain data consistency.

A method is disclosed for non-disruptively migrating data from a source LUN to a target LUN in a cluster-based data processing system, where the data is being accessed concurrently by application programs of different host computers. The copy sweep part of the migration is performed by one of the host computers, referred to as the "host copy" or HC host herein. This operation is coordinated with the duplicating of ongoing application writes of the other (or "non-HC") host computers of the cluster to maintain data consistency throughout the system.

In particular, coordination is achieved using a sequence of iterated operations and a technique known as "changed block tracking" or CBT. During a first iteration, the HC host performs the copy sweep, and new application writes occurring at the other hosts are applied to the source LUN but not immediately cloned to the target LUN. Rather, each of the other hosts uses CBT to keep a record of all the application writes to the source LUN occurring during the iteration. In each subsequent iteration, the data blocks of the CBT-recorded writes from the previous iteration are copied to the target LUN while new writes are recorded in new CBT records. This process continues to a desired point of completion, and then a final iteration is done with I/O suspended to bring the target LUN into complete synchronization with the source LUN. The migration then proceeds to a committed state in which the target LUN is used in place of the source LUN.

For the application writes occurring at the HC host, the HC host may immediately clone these writes to the target LUN as they occur, or it may use CBT like the other hosts. If the HC host uses cloning, then at each iteration the CBT records of all other hosts are supplied to the HC host which then copies the corresponding blocks to the target LUN while it continues to clone its own newly generated writes. These operations are coordinated at the HC host to avoid data corruption. If the HC host uses CBT, then each host can copy the blocks of the recorded writes from its own CBT records to the target LUN, while recording newly generated writes in new CBT records to be applied in the next iteration.

The technique achieves desired non-disruptive migration in an active-active cluster in which a source LUN is accessed by multiple hosts concurrently. Moreover, because it relies on host copy and a host-executed coordination mechanism for the cloned writes (CBT and iteration), it does not require any specific type of storage system or other external components (e.g., external write duplication functionality) and thus may be generally deployed in a variety of types of data processing systems.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
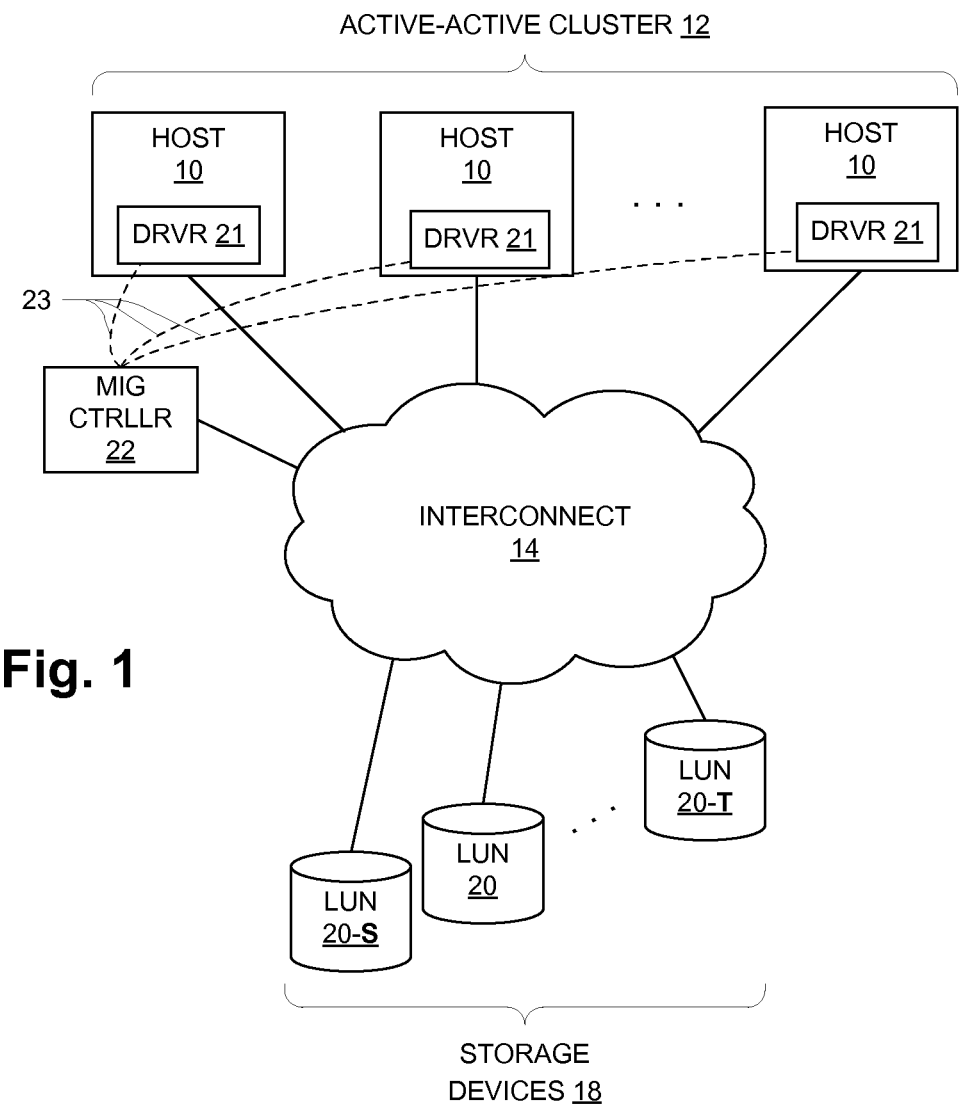
FIG. 1 is a block diagram of a data processing system.

FIG. 1 shows a data processing system having a set of host computers (HOSTs) 10 which are configured as a group referred to as an "active-active cluster" 12. The hosts 10, which are also referred to as "nodes" herein, are connected by interconnect 14 to storage devices 18 which are also referred to as logical units or LUNs 20. Each host 10 includes a storage device driver (DRVR) 21 providing low-level functionality required for I/O access to storage devices 18. Examples are described below. In one embodiment, the cluster 12 may be formed by a plurality of physical servers each executing virtualization software enabling it to host one or more virtual machines. An example of such virtualization software is ESX Server® sold by VMWare, Inc., also referred to herein as "ESX". In another embodiment, the cluster 12 may implement a database clustering solution known as Oracle RAC from Oracle Corporation.

The interconnect 14 includes one or more storage-oriented networks providing pathways for data transfer among the hosts 10 and devices 18. An example of the interconnect 14 is a FibreChannel storage area network (SAN), either by itself or in conjunction with Ethernet or other network components. The devices 18 are logical units of storage allocated for uses such as storing databases, file systems, etc. used by application programs executing on the hosts 10. Generally, the devices 18 are visible to the hosts 10 as block-oriented storage devices.

The LUNs 20 include a source LUN 20-S and a target LUN 20-T participating in a migration operation by which the target LUN 20-T functionally replaces the source LUN 20-S in the system. It is assumed that prior to migration, the source LUN 20-S stores a data resource that is accessed by applications executing on the hosts 10 using an association mechanism that specifically associates the application-visible data resource with the source LUN 20-S. Specific examples of such association mechanisms are described below. A migration operation moves the data resource to the target LUN 20-T and changes the association mechanism so that future application accesses of the data resource are directed to the target LUN 20-T rather than to the source LUN 20-S. Reasons for such migration of storage resources include a desire for additional storage capacity or improved performance, or to upgrade to more current and well-supported hardware, for example. In some cases the source LUN 20-S is to be removed from the system, although in other cases it may be retained and reused for other purposes.

In the active-active cluster 12, there may be applications executing simultaneously on different hosts 10 having access to the source LUN 20-S. The migration operation occurs while the applications continue to execute, and thus it is in that sense non-disruptive. One aspect of the migration operation is to coordinate certain operations of the hosts 10 to ensure that there is no data loss or data incoherency created, which could have any of several deleterious effects as generally known in the art. These aspects of the migration operation are described below.

For migration operations, the system includes an actor referred to as a migration controller (MIG CTRLLR) 22. As indicated by lines 23, during a migration the migration controller 22 communicates with the drivers 21. In some embodiments the migration controller 22 may be implemented by software executing on one of the hosts 10, and in other embodiments it may be realized by software executing on a separate physical or virtual device in the system (referred to below as a "migration appliance"). The functionality of the migration controller 22 may also be divided between one of the hosts 10 and an external appliance, where the on-host portion provides a user interface and high-level control and the on-appliance portion communicates with and coordinates the actions of the hosts 10 based on higher level commands from the on-host portion.

One of the hosts 10 plays two important roles in the migration operation described herein. First, it includes functionality for bulk copying of existing data from the source LUN 20-S to the target LUN 20-T, which is also referred to as a "copy sweep" herein. Second, it may play a key role in duplicating ongoing writes to the source LUN 20-S from all the hosts 10. In the following description, this one host is referred to as the "host copy" or HC host 10, while the other hosts 10 are referred to as the "non-HC" or "other" hosts 10. In embodiments having the user interface and high-level control parts of the migration controller 22 on a host 10, it may be advantageous to use the HC host 10 for this purpose.

Figure 2:
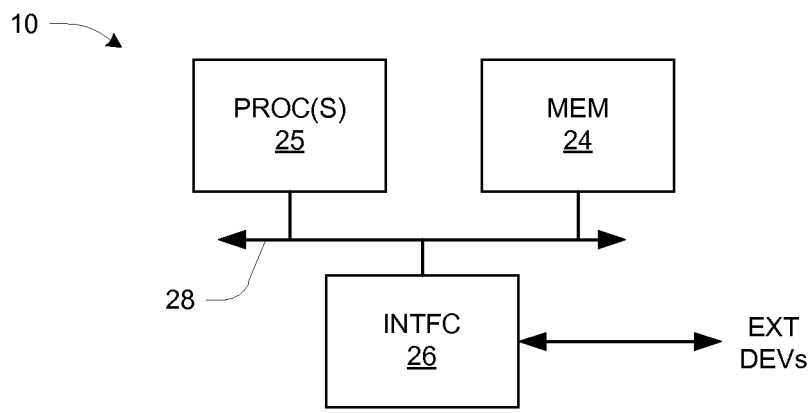
FIG. 2 is a block diagram of a hardware organization of a host.

FIG. 2 shows an example configuration of a physical computer such as a host 10 from a computer hardware perspective. The hardware includes one or more processors 25, memory 24, and interface circuitry 26 interconnected by data interconnections 28 such as one or more high-speed data buses. The interface circuitry 26 provides a hardware connection to the interconnect 14 (FIG. 1) and perhaps other external devices/connections (EXT DEVs). The processor(s) 25 with connected memory 24 may also be referred to as "processing circuitry" herein. As mentioned, there may also be local storage such as a local-attached disk drive or Flash drive. In operation, the memory 24 stores data and instructions of system software (e.g., operating system) and one or more application programs which are executed by the processor(s) 25 to cause the hardware to function in a software-defined manner. Thus the computer hardware executing instructions of a migration application, such as described below, can be referred to as a migration circuit or migration component, and it will be understood that a collection of such circuits or components can all be realized and interact with each other as one or more sets of computer processing hardware executing different computer programs as generally known in the art.

Figure 3:
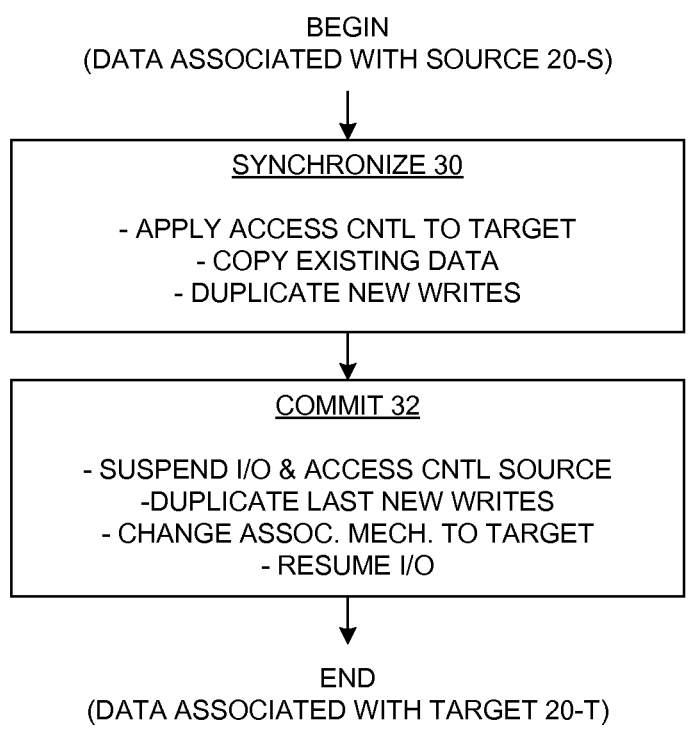
FIGS. 3 through 6 are flow diagrams for migration operations.

FIG. 3 illustrates a migration operation at a high level. As it commences, the application-visible data is associated with the source LUN 20-S as briefly described above. At 30, the target LUN 20-T is synchronized to the source LUN 20-S. As an initial step, access control is applied at each of the hosts 10 to prevent application access to the target LUN 20-T. Then there are two major additional steps: (1) the copy sweep, copying existing data from the source LUN 20-S to the target LUN 20-T; and (2) for ongoing application writes of new data to the source LUN 20-S by all hosts 10, duplicating these writes to the target LUN 20-T.

The copying (copy sweep) is done by the HC host 10 as a unitary background process proceeding sequentially through all blocks of the source LUN 20-S and copying them to corresponding locations on the target LUN 20-T.

Write duplication is somewhat more complicated, because it must be done for all writes occurring at all hosts 10, and it must be coordinated in some fashion with the copy sweep to maintain consistency between the source LUN 20-S and the target LUN 20-T. As described more below, writes are duplicated using a technique known as "changed block tracking" or CBT. During the copy sweep when the HC host 10 is copying a set of data blocks from the source LUN 20-S to the target LUN 20-T, each other host 10 keeps a CBT record identifying blocks or regions that have been changed by writes to the source LUN 20-S. Once the copy sweep is complete, the blocks or regions recorded in the CBT records are copied from the source LUN 20-S to the target LUN 20-T, and at the same time new CBT records are created to record changed blocks/regions for new writes occurring during this copying. As mentioned, writes at the HC host 10 may be cloned or the affected blocks/regions may be similarly recorded into a CBT record, to be written in the next iteration. This basic set of operations is iterated as necessary to obtain a fully synchronized relationship between the source LUN 20-S and the target LUN 20-T. The last of these iterations is performed in the later commit operation 32, as described more fully below, and thus at the completion of the synchronize operation 30 the target LUN 20-T is synchronized with the source LUN 20-S up to the point of a most recent set of writes which will be applied in that final iteration.

During the later Commit operation 32, the target LUN 20-T becomes fully synchronized to the source LUN 20-S and the hosts 10 begin using the target LUN 20-T to the exclusion of the source LUN 20-S. In particular, this includes suspending application I/O and applying access control to prevent application access to the source LUN 20-S, copying the last set of CBT-recorded blocks/regions from the source LUN 20-S to the target LUN 20-T, changing the association mechanism to newly associate the application-visible data with the target LUN 20-T, and then resuming application I/O. Future application writes to the data are automatically directed to the target LUN 20-T rather than to the source LUN 20-S. After any necessary cleanup, the source LUN 20-S can be retired or put to other use. Details of this process are also described below.

CBT is a mechanism that tracks all changes to blocks of a storage volume that have occurred since a point in time. In the present context, the point in time for a first iteration is just before the start of a copy sweep (when transitioning to a Synchronizing state). For subsequent iterations, the point in time is the end of the preceding iteration. The mechanism does not keep a copy of the changed data, rather just a log identifying blocks that have been the subject of writes. In general such a log may be maintained in any of a variety of ways. It is preferably memory-based for low latency. In one embodiment the log may be structured using a bitmap in which each bit represents a corresponding block or region of the source LUN 20-S. Changed blocks/regions are then tracked by setting the corresponding bits in the bit map.

CBT tracking may be done with respect to blocks or regions of some fixed size of at least 512 bytes. For the present technique, CBT may be done with respect to larger blocks or regions, such as 4 KiB, 8 KiB or even bigger, because the read/write step can be performed more efficiently with a larger block size. Note that these are conventional references to corresponding power-of-2 values, i.e., 4 Ki means 4,096 ($2^{12}$), etc. The block size will be a multiple of 512 bytes, the unit of writing in the SCSI storage protocol. As an example, the source LUN 20-S may have a size of 1 GiB, which is $2^{17}$ 8-KiB blocks. The CBT record for this LUN can be held in a bit map of four 4-KiB pages of memory, with one bit representing each 8-Ki block of storage. So a write to anywhere on the LUN between byte addresses 0 and 8191 would cause the first bit in the bit map to be set to 1. If desired, a larger block size can be chosen to be represented by a bit to prevent the bitmap from becoming too large.

The log method might keep the offset into the LUN and the number of bytes written. Depending on how long the iteration is and how many writes are being done, the log could keep growing and might require allocating more memory in the middle of an application write. It is believed that such conditions would be rare.

A dual-structure approach might be used to support the switching between CBT records when transitioning between iterations. For example, when bitmaps are used, a pointer might be switched to a new, zeroed bitmap when a new iteration is started, while the filled-in bit map for the iteration just ending is used to guide the block copying process. Another approach would be to copy the just-completed bitmap and send the copy elsewhere for processing (in some cases to a different host), then zero out the bitmap to be ready for the next iteration. A similar thing can be done with a log based tracking mechanism.

Figure 4:
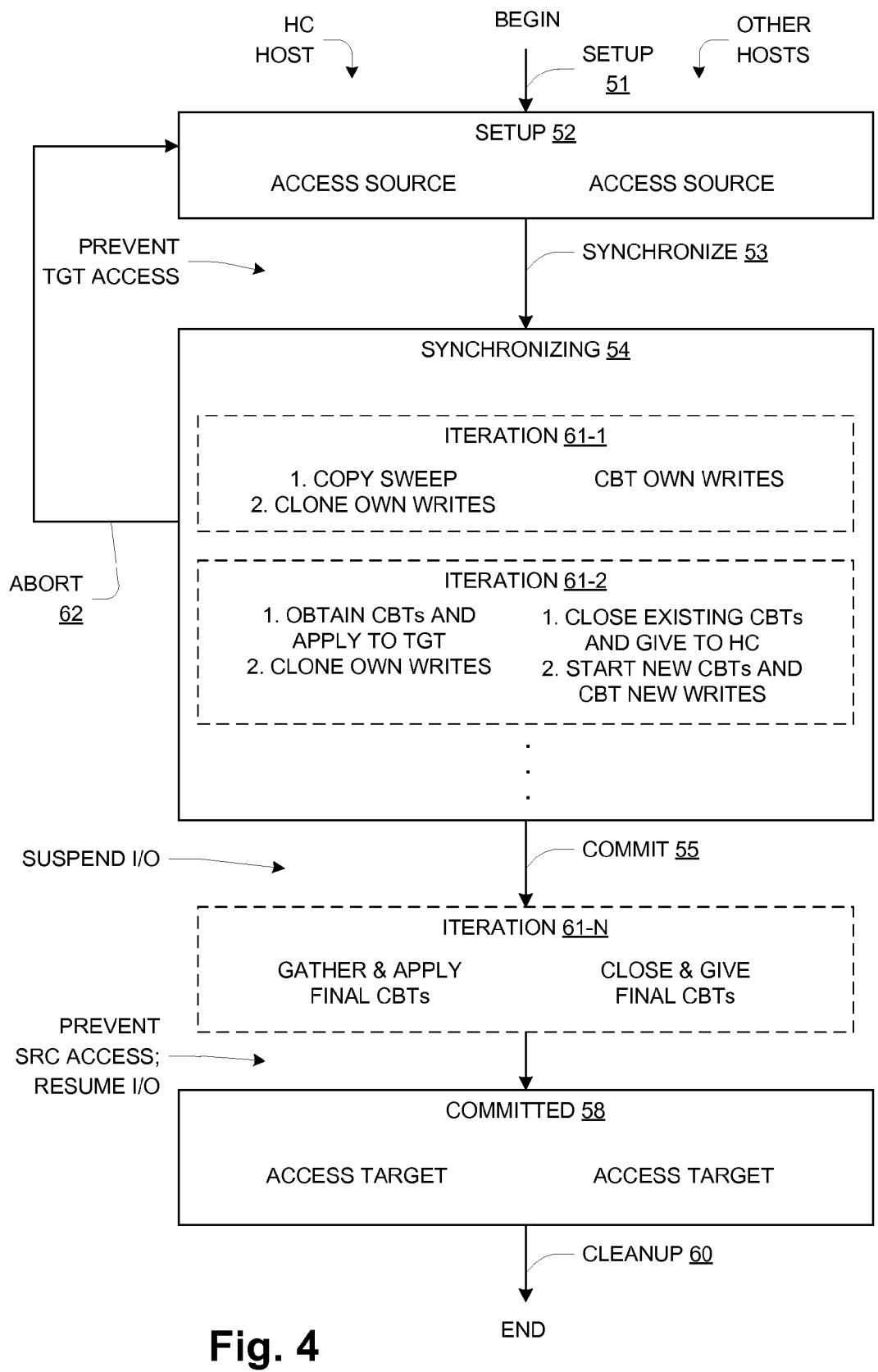

FIG. 4 illustrates progression of a migration operation according to one embodiment of a non-disruptive migration that permits ongoing operation of applications using the data resource initially associated with the source LUN 20-S. Operation proceeds from a Setup state 52 to a Synchronizing state 54 and a Committed state 58 as shown. Transitions are effected in part by a human or machine user via a command line interface (CLI) or API of the migration controller 22 (FIG. 1). Thus the transition between successive operating states may occur in response to a user's monitoring for completion of operations in one state and commanding the transition to the next state. Suitable CLI or API commands for the process of FIG. 4 might include Setup 51, Synchronize 53, Commit 55 and Cleanup 60 for example. In one embodiment, the operations performed in response to the Setup command 51 create an identifier or "handle" for each new migration operation that is initiated. Subsequent commands may use the handle to identify this migration operation as distinct from other migration operations that may be occurring at the same time. The handle implicitly identifies the source LUN 20-S and target LUN 20-T as the devices involved in the migration.

It is assumed that prior to the process both the source and target LUNs 20-S, 20-T have become configured for use by the hosts 10. The contents (data) of the source LUN 20-S constitute a data resource for operating software of the hosts 10, and there is an association mechanism that associates this data resource with the source LUN 20-S as the location of the resource. Different association mechanisms have different properties and may require different handling during a migration operation. One aspect of an association mechanism is whether it is location-dependent or location-independent, i.e., whether the association mechanism includes physical device identifying information. Another aspect of an association mechanism is whether it involves a "name" used by applications to identify the location of application data to lower-level components such as the drivers 21, or rather a "signature" stored with application data on a device 20 and used by operating software for purposes such as detection of duplication or other integrity/consistency checking. In the process of FIG. 4, it is assumed that whatever association mechanism is used, there is a way to non-disruptively make a change to the association mechanism as required to complete migration. Different specific association mechanisms and the manner in which they are handled in non-disruptive as well as disruptive migrations are discussed below.

In response to the Setup command 51 the migration controller 22 verifies that the target LUN 20-T is a suitable target, such as checking that its size (capacity) is at least the size of the source LUN 20-S. Each host 10 applies access control to prevent application access to the target LUN 20-T. The migration enters the Setup state 52, during which all hosts 10 access the source LUN 20-S.

In response to the Synchronize command 53, the migration controller 22 commands certain kernel-level components of the driver 21 of the hosts 10 to prevent application access to the target LUN 20-T, and for the synchronizing operation 30 (FIG. 3) to begin. For each of the non-HC hosts 10, this includes enabling changed-block tracking for subsequent writes to the source LUN 20-S by that host 10. This is described more below. For the HC host 10, it includes beginning the copy sweep. The HC host 10 also begins duplicating (cloning) application writes that it generates. Thus, when an application on the HC host 10 writes to the source LUN 20-S, the driver 21 of the HC host 10 will perform the write operation on the source LUN 20-S and perform the same write operation on the target LUN 20-T. This operation will continue throughout synchronization.

It should be noted that each host 10 may need to temporarily suspend input/output to the source and target LUNs 20-S, 20-T to transition into this operating mode (target access disabled and CBT/write cloning enabled), but in general it is not required that such suspension occur across all hosts 10 at the same time. However, it is necessary that each host 10 has transitioned into this operating mode before the copy sweep starts. If any of the hosts 10 is offline for some reason when synchronization is begun, it must begin operation in this operating mode when it comes back online, to ensure that all writes are recorded for later duplication to the target LUN 20-T.

At this point the migration advances to the Synchronizing state 54, during which the contents of the target LUN 20-T are made almost identical to the contents of the source LUN 20-S. The contents only become fully identical when a last set of changed blocks recorded by CBT is copied from source LUN 20-S to the target LUN 20-T, as described below. Getting to this "almost identical" state is achieved in the Synchronizing state 54 by the combination of (1) the copy sweep, in which all the existing (previously written) data of the source LUN 20-S is copied to the target LUN 20-T, and (2) duplicating the ongoing application writes performed on the source LUN 20-S to the target LUN 20-T.

Duplication is performed using multiple iterations 61-*n* of a concurrent set of operations performed by the hosts 10. In FIG. 4, operations of the HC host 10 during each iteration 61 are shown at left, while operations of the other hosts 10 are shown at right.

During the first iteration 61-1, the HC host 10 does the copy sweep. At the same time, for new writes to the source LUN 20-S by applications executing on the HC host 10, the HC host 10 clones those writes to the target LUN 20-T. Cloning requires coordination with the copy sweep, as explained below. Also during the first iteration 61-1, each other host 10 records all changed blocks caused by new application writes to the source LUN 20-S by that host 10 in local CBT records.

The second iteration 61-2 commences when the copy sweep by the HC host 10 in iteration 61-1 is completed. This transition may occur automatically, or it may require involvement of the migration controller 22 and potentially the user directing the migration. In one embodiment, the migration controller 22 may monitor the progress of the copy sweep or at least become notified of its completion. For monitoring, the migration controller 22 may periodically (or upon user command) query the HC host 10 to obtain a progress or completion indicator for the copy sweep. In one embodiment, the HC host 10 returns a value representing the number of blocks of the source LUN 20-S that have been copied. The migration controller 22 knows the size of the source LUN 20-S and can compute a percentage or fraction of completion. When the migration controller 22 is in a separate appliance, this query and response will typically employ explicit messages across the interconnect 14. When the migration controller 22 resides in the HC host 10, this query and response will use communication mechanisms within the HC host 10 as generally known in the art.

In the second iteration 61-2, the HC host 10 obtains the CBTs from the other hosts 10 and copies blocks/regions to the target LUN 20-T accordingly (i.e., it copies the identified blocks/regions of the source LUN 20-S to the target LUN 20-T). For this operation, the migration controller 22 might gather the CBT records from the other hosts 10 and then provide them to the HC host 10. This operation could be done in a host-serial manner, i.e., first obtaining the CBT records for one other host 10 and copying those blocks, then repeating the process for each remaining other host 10. In another embodiment, the CBT records of all hosts 10 may be obtained first and merged in some manner to create a merged set of changed block records, and then the blocks for this merged set are all copied. When bitmaps are used, the merging can be a logical OR operation across all bitmaps. This method may have advantages of minimizing wasteful duplication, as described more below.

As shown, each non-HC host 10 first closes the CBT records from the preceding iteration and provides the closed CBTs to the HC host 10 as part of its gather/copy process for the current iteration (61-2 in this case). Each non-HC host 10 also immediately starts new CBT records for new writes it will receive during the current iteration. The transition from the existing CBT records to the new CBT records must be done "atomically", i.e., without any operating gap that would cause any intervening write to be unrecorded. Techniques for such atomic operations are generally known in the art. As indicated above, each non-HC host 10 might provide its CBT record to the migration controller 22, which then provides the CBT information from all non-HC hosts 10 (e.g., merged or non-merged) to the HC host 10.

Iterating continues to a certain point. As a general matter, the amount of data being copied, and hence the time required at each iteration 61, decreases over a set of iterations. The first iteration 61-1 may have a very long duration because it involves copying all the previously existing data. Each subsequent iteration 61 lasts sufficiently long to copy all the blocks of all writes that were subject to CBT in the immediately preceding iteration 61. At the end of each iteration 61, there remains a set of most recently written blocks recorded in the CBT records of the hosts 10 that still need to be copied to the target LUN 20-T. In general, iterating should continue until the number of remaining writes is desirably small, because for a final iteration 61-N it is necessary to suspend application I/O which represents a performance penalty that is preferably minimized. Different criteria or mechanisms may be used to stop the iterating in different embodiments. Specific examples are discussed below.

Returning to operation in the first iteration 61-1, the cloning of application writes at the HC host 10 must be coordinated with the copy sweep. In one embodiment the storage space of the source LUN 20-S is divided into an array of fixed-size segments, such as 256 KB segments. The copy sweep is done on a segment-by-segment basis, proceeding serially from a first segment at one end of the address range of the source LUN 20-S through successive segments to the other end of the address range. Any application writes to a segment that is currently being copied are held (not performed) until the copy of that segment completes. This avoids potential data corruption that could by caused by the copy sweep overwriting newly written data. It should be noted that this same constraint applies to the subsequent iterations 61-*n*. The HC host 10 holds application writes that fall within a region being updated based on a CBT record from another host 10, and performs those writes only when the CBT-based updating is complete.

During the synchronization state 54, device faults may occur for either or both the source LUN 20-S and the target LUN 20-T. Certain effects of faults and responses to the occurrence of faults are described below.

Once synchronization is completed to the above-described point where the contents of the target LUN 20-T are almost identical to the contents of the source LUN 20-S (i.e., identical except for remaining writes in current CBT records), the user can issue a Commit command 55. This causes the following operations by the driver 21 of each host 10 under control of the migration controller 22:

1. I/O to the data resource stored on the source LUN 20-S is initially suspended on every host 10 in the cluster 12. In particular, a drain and suspend operation is performed, such that newly arriving I/Os are held and all I/Os in flight are completed.
2. Access control is changed to now permit access to the target LUN 20-T and disallow access to the source LUN 20-S. On the HC node 10, write cloning is stopped (or CBT is stopped if being used by HC node as described below). On the other nodes 10, CBT is stopped.
3. The changed blocks identified in the current CBT records of all nodes are copied from the source LUN 20-S to the target LUN 20-T. This is shown in FIG. 4 as the final iteration 61-N. It may be done in the same manner as for the preceding iterations 61, i.e., the CBT records are gathered at the HC node 10 which then copies all the corresponding blocks. Alternatively, each host 10 may perform the copying for the writes in its own CBT record, in which case the CBT records need not be provided to the HC host 10. Considerations for these alternatives are discussed below.
4. The association mechanism associating the data resource with the source LUN 20-S is changed so as to newly associate the data resource with the target LUN 20-T on every host 10 of the cluster 12. This change is done without requiring any re-configuring and re-starting of the host applications accessing the data resource. Specific examples are given below.
5. I/O to the data resource is then resumed on every host 10 of the cluster 12.

The above operations require proper sequencing. In particular, they are performed in sequential phases, each of which must be complete for every host 10 of the cluster 12 before the step(s) of the next phase can be initiated:

Phase 1—Step 1
Phase 2—Step 2 and 3
Phase 3—Step 4
Phase 4—Step 5

The migration controller 22 may take action to initiate each phase in sequence, and leave any intra-phase sequencing to each host 10. Features may be incorporated that protect the integrity of the process in the event of a host reboot during phases 2 and 3. In some embodiments, I/O suspension does not survive a reboot, and therefore without such protective features there is a possibility of inconsistency between the source LUN 20-S and the target LUN 20-T at the point of commitment. The protective features are preferably instituted at the end of Phase 1 and removed at the beginning of Phase 4. An example of such protective features is given in U.S. patent application Ser. No. 13/575,740 filed Jun. 28, 2012. In an embodiment in which I/O suspension survives a reboot, such protective mechanisms may not be necessary.

As mentioned above for step 3, the second approach (each host 10 copying the blocks for its own CBTs) may be more efficient when there are only a small number of writes in the CBT records. There are trade-offs. Performing the updates on every node allows it to happen in parallel, which should take less wall-clock time. Minimizing the time required is important because IO is suspended. However, if all the nodes modify a very similar set of blocks, then some blocks/regions may be copied multiple times. Such duplication can be avoided by gathering the CBTs at the migration controller 22 or HC host 10 and first merging the records before copying the corresponding blocks/regions.

Once the above operations have been performed, the migration enters the Committed state 58. In this state, application I/O is automatically directed to the target LUN 20-T and not to the source LUN 20-S, by virtue of the change to the association mechanism. The target LUN 20-T will store all newly written data, and no synchronization is maintained with the source LUN 20-5. It is generally not possible to revert to operating with the source LUN 20-S.

As mentioned, the above operations are initiated by a Commit command 55 from a user in one embodiment. The migration controller 22 may be used to monitor progress and provide information that synchronization is sufficiently complete to move into the Committed state 58. In alternative embodiments, the operations may be initiated automatically. As mentioned above, the series of iterations 61 will generally be of successively shorter durations, and some automatic mechanism may be used to stop the iterating and then initiate the final iteration 61-N and transition to the Committed state 58 as described above. In one embodiment, this may be achieved by monitoring the number of blocks being copied to the target LUN 20-T in each iteration, and testing whether it has diminished below some threshold. Alternatively there may be monitoring of the time required for each iteration, and initiating the above steps when an iteration is of shorter duration than some threshold. In yet another approach, there may be monitoring for a sufficiently small difference between the sizes or durations of successive iterations 16, indicating that no efficiency is to be gained by additional iterating. Yet another approach may be to always perform a predetermined number of iterations, where this number may be fixed or in some manner programmable or configurable. In a system such as that of FIG. 1, the control logic for such monitoring and initiation of the commitment steps may be located in the migration controller 22. In an embodiment providing for automatic transition to the Committed state 58, there may or may not also be support for user-initiated transition such as through use of a Commit command 55. There may also be a way for a user to temporarily override an automatic mechanism, so that operation in the synchronizing state 54 can continue indefinitely until the override is cancelled.

A cleanup command 60 initiates a cleanup operation to remove any remaining metadata associating the source LUN 20-S with the storage resource that has been migrated. At that point, the source LUN 20-S may be removed from the system, or it may be re-configured for another use in the system. One important task performed during cleanup is to erase any information on the source device 20-S that might cause it to be identified mistakenly as the storage resource that has been migrated to the target device 20-T. Earlier in the migration, access control prevents this "mistaken identity". Along with erasure, the source LUN 20-S may have its contents replaced by a known pattern (such as all zeros) for security or other operational reasons.

The process of FIG. 4 includes an abort path 62 leading from the Synchronizing state 54 back to the Setup state 52. Aborting may occur by user command or by automatic operation when problems are encountered during the process. For example, if either the source LUN 20-S or target LUN 20-T fails or otherwise becomes unavailable during the process, such failure may be detected either manually or automatically and lead to aborting the migration.

More particularly with respect to failures, a device fault is a write failure to either the source or target LUNs 20-S, 20-T.

When the HC host 10 uses write cloning, all writes of the HC host 10 are duplicated, and migration can only proceed if both writes (original and clone) succeed. If one succeeds and the other fails, the migration must be aborted. In this case, the migration will go into a "target device faulted" state at this point, and the user will have to execute the abort and start over, perhaps first curing whatever problem caused the fault. A fault could also happen when updating the target LUN 20-T based on the CBT records, and this would also result in a fault condition that would require an abort. The copy sweep operation could also fail, due to a read failure on the source LUN 20-S or a write failure on the target LUN 20-T. This is not a device fault, but it will cause the synchronization to stop. An explanation of the handling of device faults in a non-cluster environment can be found in the above-referenced U.S. Pat. No. 7,770,053.

Device fault handling in the cluster environment may be generally similar to that described in the '053 patent, but there are specific differences. For example, in the non-cluster environment as described in the '053 patent, there are additional operating states including a source selected state and a target selected state. In the target selected state, reads are redirected to the target device while writes are still being duplicated and synchronization is being maintained. If the system should be shut down unexpectedly, upon restart the non-selected side is faulted because there's no guarantee that all writes made it to both sides. Thus the source device is faulted if this occurs during operation in the target selected state. Also, if a fault happens during normal I/O, then the side that fails the write will be faulted, so the source side is faulted when operating in the source selected state and a write to the source device fails. In contrast, in the cluster environment as described herein, operation proceeds directly from the Synchronizing state 54 to the Committed state 58 or a Committed and Redirected state (described below); there is no source selected state or target selected state. Only the target LUN 20-T is faulted when a write fails, no matter which side the write fails on.

One possibility with the present migration technique is that a cloned write by the HC host 10 that experiences a fault in one iteration 61 could potentially be added to a CBT record at the HC host 10 and retried in the next iteration 61. If the fault condition has cleared, the retried write may succeed and thus the migration need not be aborted. In some embodiments, retrying may continue until the final iteration 61-N, but in other embodiments it may be limited to a smaller limit such as one retry.

Figure 5:
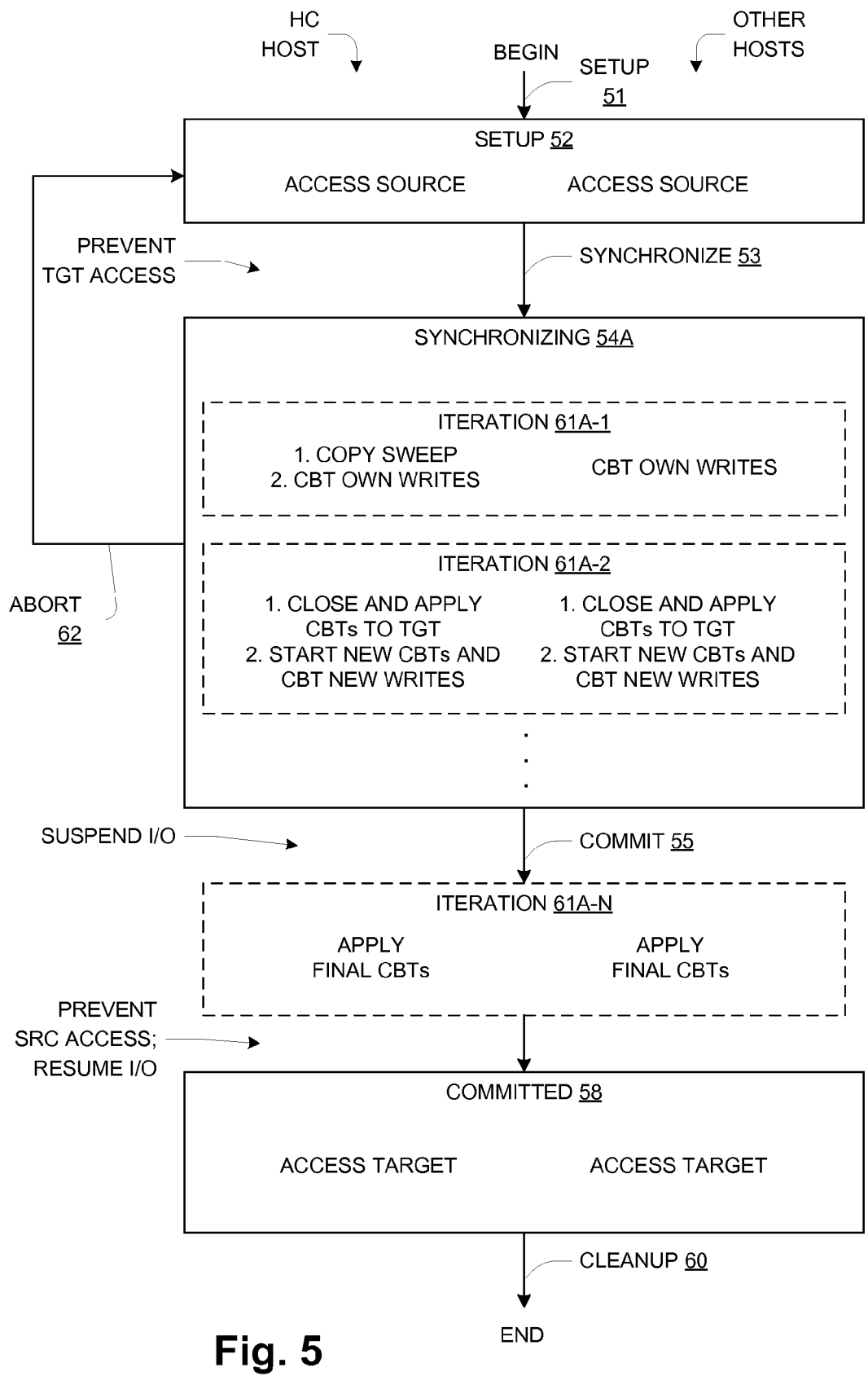

FIG. 5 shows an alternative embodiment. Overall operation is similar to that of FIG. 4, but it differs in the manner of duplicating application writes to the target LUN 20-T. In this embodiment, the HC host 10 employs CBT like the other hosts 10, instead of using write cloning as described above. Thus in each iteration 61A except for the last (61A-N), all hosts 10 record new application writes in respective CBT records, and in all iterations 61A except for the first (61A-1), all hosts 10 copy the blocks recorded in the preceding iteration 61A to the target LUN 20-T. No transfer of CBT records to the HC host 10 is necessary.

When the HC host 10 employs CBT instead of cloning, the CBT-based updating of each iteration 61 is done in parallel on all the hosts 10 and without suspending application I/O at any host 10. Additionally, none of the hosts 10 needs to coordinate writes in the special manner described above for HC host 10 in the process of FIG. 4. In the first iteration 61A-1, the location of all the new application writes are held in CBT records and used to update the target LUN 20-T at these locations only in the second iteration 61A-2, after the initial copy sweep is complete. Thus the copy sweep cannot overwrite the data at these locations. Similarly, in subsequent iterations 61A, the location of all the new application writes are likewise held in CBT records and used to update the target LUN 20-T in the next iteration 61A, after all updates in the preceding iteration 61A have been applied. The updating of data for locations from CBT records cannot overwrite the data of current writes.

Figure 6:
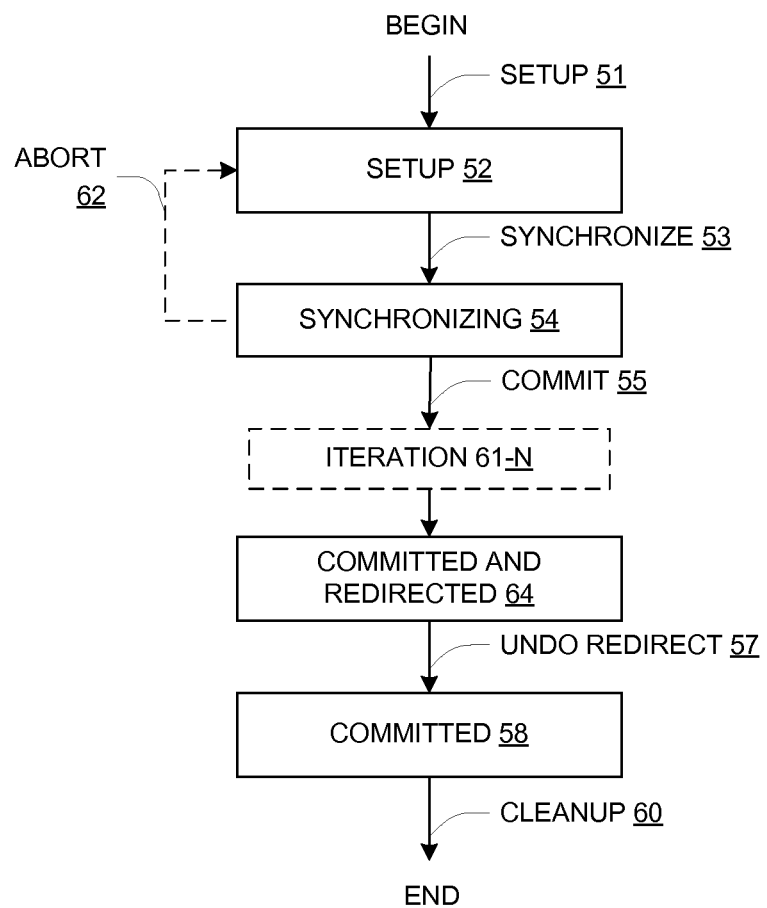

FIG. 6 depicts an alternative flow for a migration operation usable when it is necessary to stop operation of host application software in order to make the change to the association mechanism that associates the data resource with a particular LUN 20. This type of migration may be termed "minimally disruptive", as application operation continues during the Synchronizing state 54 and is only stopped as needed to enable transition to the Committed state 58. The flow is similar to that of FIGS. 4 and 5 except for a transition into a Committed and Redirected state 64 before the transition into the (fully) Committed state 58. In this flow, when the Commit command 55 is issued the migration controller 22 issues messages to the drivers 21 to stop the cloning and CBT recording of writes and to begin redirecting any I/O intended for the source LUN 20-S to the target LUN 20-T. Once the drivers 21 of all hosts 10 are operating in this fashion, the migration enters the Committed and Redirected state 64 which is described below. Operation continues there until the migration controller 22 subsequently receives an Undo Redirect command 57 and responds by sending messages to the drivers 21 to stop this redirecting. Operation then proceeds to the (fully) Committed state 58 which is as described above. A more detailed explanation of similar operations can be found in the above-referenced U.S. Pat. No. 7,809,912.

The purpose of the Committed and Redirected state 64 is to support a separate task of changing the association mechanism that associates the data resource with a source LUN 20-S so that the data resource can be newly associated with the target LUN 20-T. This is the point at which disruption occurs, where for example one or more applications of the hosts 10 may be stopped, reconfigured as necessary to create the new association, and then restarted. Once the change is made, the system can operate correctly using the new association with the target LUN 20-T so that redirection is no longer required.

Once the application is stopped, redirection and changing the association mechanism can generally be done in either order, as redirection has no effect when the application is stopped. In some cases the association mechanism may be changed while redirection is still in effect. With some association mechanisms, it may be necessary to stop redirection prior to updating the association mechanism. In either case, prior to restarting normal operation (e.g., restarting any applications that are being reconfigured), the Undo Redirect command 57 is used to advance the migration state to Committed 58. Normal operation is then resumed. It should be noted that at least some control communications (such as SCSI Inquiry commands) are not redirected, so that each LUN 20 remains directly accessible for purposes of receiving or providing corresponding control-related information.

As mentioned above, there are several specific cases of association mechanisms that associate a data resource with the location (LUN 20) of the data resource. Specific cases may differ along one or more of the following dimensions:

A. An application-visible name used to identify the LUN to which an I/O command is directed, versus a signature stored on a device used to enable an application to be associated with the device.

B. Location dependence versus location independence, i.e., whether the association mechanism involves use of a name or signature that contains physical device location information C. Whether the association mechanism can be changed non-disruptively or requires disruption of normal operation Specific examples that differ in one or more of the above respects are provided below.

Figure 7:
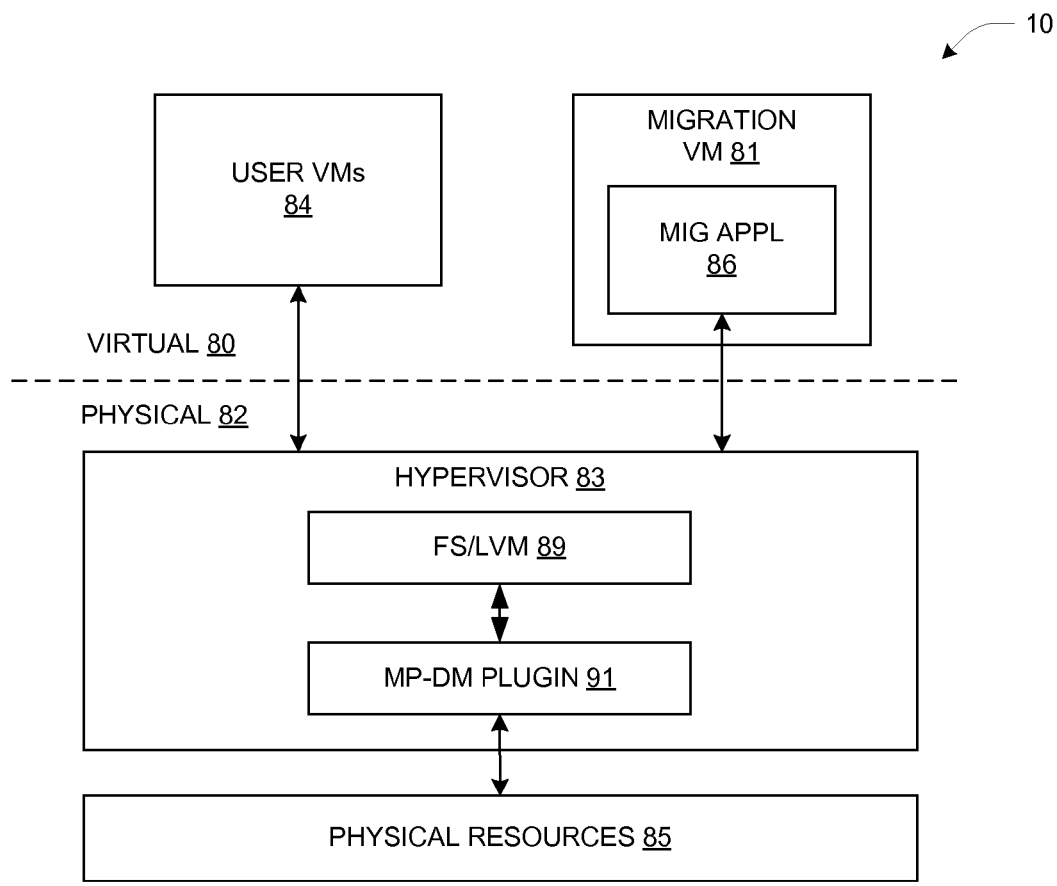
FIGS. 7 and 8 are block diagrams of software organizations of a host.

FIG. 7 shows a view of a host 10 according to one embodiment from primarily a software perspective, i.e., a collection of software-implemented functional components as discussed above. The operating environment is divided between a virtual space 80 and physical space 82 as generally known in the art. In virtual space 80 resides one or more user virtual machines (user VMs) 84 executing application programs or "applications" (not shown). Virtual space 80 also includes a migration VM 81 used specifically to execute a migration application 86. The physical space 82 includes physical resources 85 such as processors, memory, input/output circuitry etc. (per FIG. 2 described above). It will be appreciated that the physical resources 85 also include the interconnect 14 and storage devices 18 of FIG. 1. The physical space 82 also includes certain system-level software being executed using the physical resources 85, namely a hypervisor 83 which includes a file system and/or logical volume manager (FS/LVM) 89 and a driver component shown as an MP-DM plugin 91. The MP-DM plugin 91 functions as part of a storage driver 21 as described above with reference to FIG. 1, and provides multi-path (MP) storage access as well as data migration (DM) functionality used in concert with the migration application 86.

The application(s) executed by the user VMs 84 may be conventional user-level applications such as a web server, database application, simulation tool, etc. These access data of so-called virtual disks that are presented by the hypervisor 83. The hypervisor 83 itself employs the FS/LVM 89 and devices 18 of FIG. 1 as the underlying real (physical) storage. The MP-DM plugin 91 is a component working in conjunction with other storage device driver code (not shown) of the hypervisor 83 to carry out the reading and writing of data from/to the devices 18 in operation of the FS/LVM 89. The MP-DM plugin 91 may provide specialized and/or enhanced input/output functionality with respect to the devices 18. For example, it may include multipathing functionality and an ability to access individual LUNs 20 via multiple paths, using the paths for increased performance and/or availability. An example of such multipathing functionality is that provided by the PowerPath®/VE product sold by EMC Corporation.

The migration application 86 is a specialized application providing the functionality of the migration controller 22 described above. In particular, the migration application 86 carries out higher-level logic and user-facing functionality of migration. For example, it may provide the above-mentioned command-line interface or application programming interface (API) for interacting with a human or machine user that exercises control over a migration process. In operation it communicates with the MP-DM plugin 91 of each host 10 to cause the MP-DM plugin 91 of each host 10 to perform lower-level operations pertaining to migration. One example is the above-discussed duplication of writes, used to maintain synchronization between the source LUN 20-S and the target LUN 20-T. Another is to prevent access to the target LUN 20-T prior to the migration becoming committed, as well as preventing access to the source LUN 20-S once the migration has become committed. The migration VM 81 of a given host 10 may call directly to the other hosts 10 through a so-called common information model object manager or CIMOM. More generically, a call may be made through a "listener" employing a migration-specific component that handles function invocations used to provide commands to the MP-DM plugin 91 at each migration step. Overall, communication is done by the migration VM 81 invoking each kernel action on each host 10 as needed, through each individual host's listener.

The hypervisor 83 in a host 10 such as shown in FIG. 7 may employ a construct known as a "datastore" in its use of storage devices 18. This construct is used by ESX, for example. A datastore is an organized container usable by the FS/LVM 89 to store files which implement virtual disks presented to the user VMs 84. Each datastore is assigned a unique "signature" which includes information identifying the device 18 on which the datastore resides. A signature is a set of information (metadata) written on the device 18 itself. For ESX, it includes a device identifier associated with the device 18 by the physical storage system (array) and which is returned in response to a SCSI extended inquiry command for vital product data (VPD page 0x83), for example. ESX writes this SCSI property onto the device 18 on which the datastore resides. When ESX accesses the datastore, it checks the signature included in the datastore against the device identifier as returned by the SCSI extended inquiry command for VPD page 0x83 for the device 18 on which the datastore resides. The values must match in order for the access to be handled normally. If there is a mismatch, ESX treats it as an error condition and does not complete the access. This is done to prevent a replica of the datastore being used in place of the actual datastore.

It will be appreciated that the datastore signature as described above is a location-dependent association mechanism associating the datastore with the device 18 where the datastore is located. When a datastore is copied from a source LUN 20-S to a target LUN 20-T, the existing signature is also copied, so that the signature for the datastore as residing on the target LUN 20-T identifies the source LUN 20-S instead of the target LUN 20-T. If the datastore were accessed from the target LUN 20-T in this condition, the signature checking would fail, because the signature having the device identifier for the source LUN 20-S does not match the device identifier for the target LUN 20-T on which the datastore now resides. In order for the migration to be fully completed, the signature must be changed to include the device identifier of the target LUN 20-T instead of the device identifier of the source LUN 20-S.

In one embodiment, the disruptive process of FIG. 6 may be used along with a separate "resignaturing" process that is performed while the migration is in the Committed and Redirected state 64. More comprehensively, the following sequence of actions may be performed:

a. Stop operation of all VMs 84 (of all hosts 10) for which the datastore is used as underlying storage
b. Resignature the datastore on the target LUN 20-T
c. Use the Undo Redirect command 57 to transition the migration to the Committed state 58
d. Restart operation of the VMs 84

In other embodiments, another process may be used to effect resignaturing without requiring the stopping and starting of the pertinent VMs 84. In such a case, the non-disruptive process of FIG. 4 or FIG. 5 may be used. It should also be noted that in other types of systems, notably the Windows® operating system from Microsoft, signatures are also employed but they do not include physical device identifying information and thus are location-independent. In this case also a non-disruptive process such as that of FIG. 4 or FIG. 5 may be used, because the signature is copied to the target LUN 20-T as part of the migration.

While the above description focuses on use of signatures in particular in the system of FIG. 7, in alternative embodiments other associating mechanisms may be used and are handled in a corresponding manner. For example, the system may use device names such as described below, and in that case operations the same or similar to those described below may be used.

Figure 8:
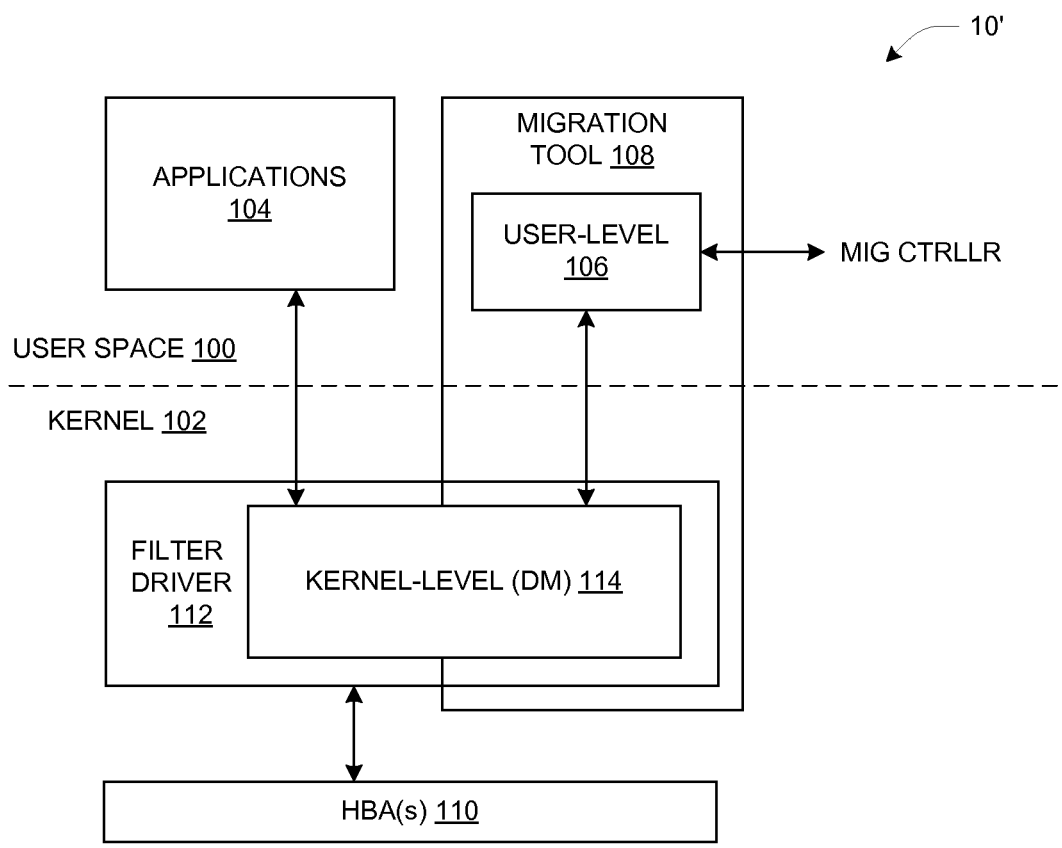

FIG. 8 shows an alternatively organized host 10' from a software perspective, i.e., a collection of software-implemented functional components as discussed above. The operating environment is divided between unprivileged user space 100 and privileged system or kernel space 102 as generally known in the art. In user space 100 resides one or more application programs (APPLICATIONS) 104 and a user-level part 106 of a migration tool 108. The applications 104 may be conventional user-level applications such as a web server, database application, simulation tool, etc., accessing data of the storage devices 18 (FIG. 1) using system calls as known in the art.

A filter driver 112 is a component working in conjunction with a standard device driver (not shown) as part of an operating system that implements the system calls, reading and writing data from/to the user devices 18 via host bus adapters (HBAs) 110 as requested by the applications 104. The filter driver 112 may provide specialized and/or enhanced input/output functionality with respect to the user devices 18. For example, in one embodiment the filter driver 112 may be a multipathing driver having an ability to access individual LUNs 20 via multiple paths, and it manages the use of the paths for increased performance and/or availability. An example of a multipathing driver is the above-mentioned PowerPath® driver.

The migration tool 108 contains functionality for data migration operations. The user-level part 106 carries out higher-level logic under control of the migration controller 22 (FIG. 1). A kernel-level part 114 of the migration tool 108 performs lower-level operation such as that provided by MP-DM plugin 91 (FIG. 7). The kernel-level part 114 may be realized in one embodiment as an extension component having a defined interface to a basic or core set of components of the filter driver 112.

It should be noted that the applications 104 may be virtual machines that contain user applications. Also, referring back to FIG. 7, although not shown there is a kernel space and there may be a user space.

As previously indicated, the migration controller 22 is a single point of control for migrations. It can reside in an off-host computerized device ("appliance") or in one of the hosts 10' in the cluster 12. When the migration controller 22 is realized in an off-host migration appliance, then a migration is initiated at the appliance and the commands executed on each host 10' are subordinate commands. The above-described flows may be augmented as follows. During setup, a "-cluster" flag may be added to the Setup command 51 that lists the hosts 10' in the cluster 12. This command is executed on the appliance. The appliance in turn, calls Setup -cluster on each host 10' with another flag "-sub" (subordinate). This is a system-level command for communications between the appliance and hosts 10', not available to users. Alternatively, the API on the host 10' may be invoked with the same information. The "-sub" flag indicates to the host 10' receiving the command that the host 10' is only doing host-specific setup actions and not setting up the overall migration which happens only once from the appliance. For the Synchronize command 53, the user runs it on the appliance. The appliance in turn, invokes the Synchronize command 53 or API on each host 10'. Each host sets up the host-specific state for the synchronization. Once all hosts 10' have successfully performed these tasks, the appliance code invokes the technology-specific code to start the copy operation. The commit operation may require multiple staged operations at the hosts 10', i.e., the four commit phases discussed above with reference to FIG. 4. As for the other commands, during the Commit command 55 the appliance is the only place that technology-specific code is called. Cleanup follows the same pattern as synchronize, but there's no technology specific code. The Undo Redirect command 57, if used, also works like synchronize, because it is assumed that the application using the target LUN 20-T is not running when that command executes.

The above-referenced U.S. Pat. No. 7,904,681 provides two examples of association mechanisms that associate application-visible data with a particular LUN. In one case, applications (including a file system or logical volume manager) are each configured with a native name of the source LUN 20-S and each uses this name in all I/O commands for the associated data (e.g., database records). In this case, the minimally disruptive process of FIG. 6 may be used for migration, and during the Committed and Redirected state 64 all applications using such a native name are stopped and reconfigured with the native name of the target LUN 20-T. These application are then restarted after the Undo Redirect command 57 is received and the migration is in the Committed state 58. In another case, applications are configured with a so-called "pseudoname" that is mapped by lower-level driver components to a particular LUN. In the present context, this mapping will initially associate the pseudoname with an identifier of the source LUN 20-S. The non-disruptive process of FIG. 4 or FIG. 5 can be used, and the mapping changed as part of the transition into the Committed state 58 as described above. While these association mechanisms and operations are described with reference to a host similar to host 10', they may also be used in a host 10 of the type shown in FIG. 7.

While various embodiments of the invention have been particularly shown and described, it will be understood by those skilled in the art that various changes in form and details may be made therein without departing from the spirit and scope of the invention as defined by the appended claims.

What is claimed is:

1. A method of migrating data from a source LUN to a target LUN in a data processing system having a cluster of multiple host computers and a storage subsystem containing the source LUN and the target LUN, the data being accessed concurrently by applications of the host computers using an association mechanism in each of the host computers initially associating the data with the source LUN as the location of the data in the system, comprising:

performing a synchronization as iterations of concurrent operations at the host computers, a first iteration including a copy sweep by a first host computer to copy all existing data blocks of the source LUN to the target LUN, the first iteration and each subsequent iteration including at each of second host computers recording the locations of data blocks changed by application writes to the source LUN, the recording employing a respective changed-block record of the respective second host computer, each subsequent iteration also including, for each data block location identified in the changed-block record of each of the second host computers for the preceding iteration, copying the corresponding data blocks of the source LUN to the target LUN; and upon completion of the synchronization, performing a commitment including a final iteration and a transition to operation with the target LUN, the final iteration including, for a final set of recorded locations of data blocks in the changed-block record of each of the second host computers, copying the corresponding data blocks of the source LUN to the target LUN, the transition including at each host computer disabling application access to the source LUN and modifying the association mechanism to newly associate the data with the target LUN as the location of the data in the system.

2. A method according to claim 1, wherein during the first iteration and each subsequent iteration the first host computer clones new application writes for the source LUN to the target LUN, the cloning being coordinated with the copy sweep in the first iteration to prevent the copy sweep from overwriting data of a cloned new application write.

3. A method according to claim 2, wherein storage space of the source and target LUNs is divided into fixed-size sequential segments and the copy sweep is done on a segment-by-segment basis for all segments of the source LUN, and wherein the cloning is coordinated with the copy sweep in the first iteration by temporarily holding application writes directed to a segment currently being copied and subsequently performing the held application writes after completion of copying of the segment.

4. A method according to claim 2, wherein each subsequent iteration includes gathering the recorded data block locations from the changed-block records of the second host computers for the preceding iteration at the first host computer, and wherein the copying of the corresponding data blocks is performed by the first host computer, the copying being coordinated with the cloning of the new application writes at the first host computer to prevent the copying from overwriting data of a cloned new application write.

5. A method according to claim 4, wherein each subsequent iteration includes merging the changed-block records of the second host computers at the first host computer to create a merged set of recorded data block locations, and wherein the copying of the corresponding data blocks is based on the merged set of recorded data block locations.

6. A method according to claim 2, further including at the first host computer monitoring for failure of a cloned new application write and recording corresponding data block locations for the failed application write in a changed-block record of the first host computer, and subsequently copying the corresponding data blocks of the source LUN to the target LUN.

7. A method according to claim 1, wherein during the first iteration and each subsequent iteration the first host computer records the locations of data blocks of new application writes for the source LUN in a changed-block record of the first host computer, and wherein each subsequent iteration includes, at the first host computer for data block locations recorded in the changed-block record of the first host computer, copying the corresponding data blocks of the source LUN to the target LUN.

8. A method according to claim 7, wherein the copying of the corresponding data blocks for the recorded application writes of each of the second host computers is performed by the respective second host computer.

9. A method according to claim 1, controlled by a migration controller in communication with each of the host computers, the migration controller providing a user interface and performing migration control functions in response to user commands received at the user interface, the migration control functions including initiating and monitoring the synchronization and commitment operations at each of the host computers.

10. A method according to claim 9, wherein the migration controller is wholly located on an appliance coupled to the host computers by a communications network, and wherein each of the host computers provides an interface over a network connection to the migration controller by which the migration controller initiates and monitors the synchronization and commitment operations at each host computer.

11. A method according to claim 9, wherein at least the user interface and a high-level control portion of the migration controller are located on the first host computer.

12. A method according to claim 11, wherein a per-host communications portion of the migration controller is located on an appliance separate from the host computers and communicatively coupled to the first host computer to interface to the high-level control portion of the migration controller.

13. A method according to claim 11, wherein the entirety of the migration controller is located on the first host computer, the first host computer provides an internal interface to the migration controller by which the migration controller initiates and monitors the synchronization and commitment operations at the first host computer, and each of the second host computers provides an interface over a network connection to the first host computer by which the migration controller initiates and monitors the synchronization and commitment operations at each host computer.

14. A method according to claim 9, wherein the migration controller ensures that each host is in a setup state before the synchronization is initiated, the setup state including disabling of application access to the target LUN, and further including a transition into the synchronization from the setup state, the transition including enabling the copy sweep at the first host computer, the recording of changed data blocks at the second host computers, and either write cloning or recording of changed data blocks at the first host computer.

15. A method according to claim 9, wherein the migration controller is operative to control the commitment by a process including:
  1) initially suspending input/output to the source LUN on each host computer;
  2) subsequently modifying access control at each host computer to permit access to the target LUN and disallow access to the source LUN, and stopping the recording of changed blocks at the each of the second host computers;
  3) commanding the final iteration and transition of the commitment, including resuming input/output to the data on every host of the cluster.

16. A method according to claim 9, wherein the migration control functions include coordinating the execution of each iteration across all the hosts, the coordinating including (1) gathering the changed-block records of the second host computers for a just completed iteration and (2) providing recorded block locations from the gathered changed-block records to the first host computer for use in copying the corresponding data blocks to the target LUN in a next iteration.

17. A method according to claim 16, further including merging data block locations from the gathered changed-block records to create a merged set of data block locations, and wherein the providing includes providing the merged set of data block locations to the first host computer.

18. A method according to claim 9, wherein the commitment is initiated by the migration controller automatically in response to detecting completion of the synchronization.

19. A method according to claim 9, wherein the migration controller includes a user interface permitting at least one of user initiation of the commitment and user override of the automatic initiation of the commitment.

20. A method according to claim 1, wherein completion of the synchronization leaves a final set of recorded data block locations in the changed-block records of the second host computers, and wherein the commitment operation includes copying the corresponding data blocks from the source LUN to the target LUN.

21. A method according to claim 20, wherein the copying of the corresponding data blocks is performed by the first host computer after obtaining the recorded data block locations from the second host computers.

22. A method according to claim 20, wherein the copying of the corresponding data blocks is performed by the second host computers, each second host computer performing the copying for its respective final recorded data block locations.

23. A method according to claim 1, wherein the completion of synchronization is detected and the commitment begun by an automatic mechanism monitoring size or duration of the copying at each iteration.

24. A non-transitory computer readable medium having computer program instructions recorded thereon, the computer program instructions including first instructions executable by a first host computer and second instructions executable by each of second host computers to cause the first and second host computers to perform respective parts of a method of migrating data from a source LUN to a target LUN in a data processing system having a cluster of multiple host computers and a storage subsystem containing the source LUN and the target LUN, the data being accessed concurrently by applications of the host computers using an association mechanism in each of the host computers initially associating the data with the source LUN as the location of the data in the system, the method including:

performing a synchronization as iterations of concurrent operations at the host computers, a first iteration including a copy sweep by a first host computer to copy all existing data blocks of the source LUN to the target LUN, the first iteration and each subsequent iteration including at each of second host computers recording the locations of data blocks changed by application writes to the source LUN, the recording employing a respective changed-block record of the respective second host computer, each subsequent iteration also including, for each data block location identified in the changed-block record of each of the second host computers for the preceding iteration, copying the corresponding data blocks of the source LUN to the target LUN; and upon completion of the synchronization, performing a commitment including a final iteration and a transition to operation with the target LUN, the final iteration including, for a final set of recorded locations of data blocks in the changed-block record of each of the second host computers, copying the corresponding data blocks of the source LUN to the target LUN, the transition including at each host computer disabling application access to the source LUN and modifying the association mechanism to newly associate the data with the target LUN as the location of the data in the system.

25. A data processing system, comprising:
a cluster of host computers including a first host computer and one or more second host computers; and
a storage subsystem coupled to the cluster of host computers, the storage subsystem containing a source LUN and a target LUN, the source LUN storing data being accessed concurrently by applications of the host computers using an association mechanism in each of the host computers initially associating the data with the source LUN as the location of the data in the system,
wherein the first and second host computers are operative to perform respective parts of a method of migrating the data from the source LUN to the target LUN, the method including:

performing a synchronization as iterations of concurrent operations at the host computers, a first iteration including a copy sweep by a first host computer to copy all existing data blocks of the source LUN to the target LUN, the first iteration and each subsequent iteration including at each of second host computers recording the locations of data blocks changed by application writes to the source LUN, the recording employing a respective changed-block record of the respective second host computer, each subsequent iteration also including, for each data block location identified in the changed-block record of each of the second host computers for the preceding iteration, copying the corresponding data blocks of the source LUN to the target LUN; and upon completion of the synchronization, performing a commitment including a final iteration and a transition to operation with the target LUN, the final iteration including, for a final set of recorded locations of data blocks in the changed-block record of each of the second host computers, copying the corresponding data blocks of the source LUN to the target LUN, the transition including at each host computer disabling application access to the source LUN and modifying the association mechanism to newly associate the data with the target LUN as the location of the data in the system.

* * * * *